(12) United States Patent
Sawin et al.

(10) Patent No.: US 7,466,624 B2
(45) Date of Patent: Dec. 16, 2008

(54) ARMORED SEABED LAID SEISMIC CABLE AND METHOD AND APPARATUS FOR MANUFACTURING SAME

(75) Inventors: Frederick C. Sawin, Houston, TX (US); Roy W. James, Katy, TX (US); Karl J. Schuler, Sugar Land, TX (US); Gary J. Zernia, Spring, TX (US)

(73) Assignee: Geospace Engineering Resources International, L.P., Houston, TX (US)

( * ) Notice: Subject to any disclaimer, the term of this patent is extended or adjusted under 35 U.S.C. 154(b) by 67 days.

(21) Appl. No.: 11/550,365

(22) Filed: Oct. 17, 2006

(65) Prior Publication Data

US 2007/0085545 A1 Apr. 19, 2007

Related U.S. Application Data

(63) Continuation of application No. 10/283,426, filed on Oct. 29, 2002, now Pat. No. 7,184,364.

(51) Int. Cl.
*G01V 1/38* (2006.01)

(52) U.S. Cl. .......................... 367/20; 367/15; 367/153; 367/154

(58) Field of Classification Search .................. 367/15, 367/20, 153, 154; 174/101.5
See application file for complete search history.

(56) References Cited

U.S. PATENT DOCUMENTS

| | | | |
|---|---|---|---|
| 2,352,158 A | 6/1944 | Bishop | |
| 2,471,046 A | 5/1949 | Smith et al. | |
| 2,471,465 A | 5/1949 | Hasselt | |
| 2,708,742 A | 5/1955 | Harris | |
| 2,738,488 A | 3/1956 | Macknight | |
| 2,984,063 A | 5/1961 | Pouzet | |
| 3,006,792 A | 10/1961 | Monelli | |
| 3,168,614 A | 2/1965 | Munn et al. | |
| 3,749,816 A | 7/1973 | Shaw | |
| 3,806,568 A | 4/1974 | Carlson et al. | |
| 3,939,464 A | 2/1976 | Swenson | |
| 4,078,223 A | 3/1978 | Strange | |
| 4,241,427 A | 12/1980 | Swenson | |
| 4,295,212 A | 10/1981 | Swenson | |
| 4,439,633 A | 3/1984 | Grooten | |
| 4,745,628 A | 5/1988 | McDavid et al. | |
| 4,955,012 A | 9/1990 | Bledsoe et al. | |
| 4,979,795 A | 12/1990 | Mascarenhas | |
| 5,471,436 A | 11/1995 | Harvey | |

(Continued)

FOREIGN PATENT DOCUMENTS

GB 2215461 A 9/1989

*Primary Examiner*—Jack W Keith
*Assistant Examiner*—Scott A Hughes
(74) *Attorney, Agent, or Firm*—Gary L. Bush; Andrews Kurth LLP (57) ABSTRACT

A method for wrapping continuous strands of steel wire about a seismic cable including interconnected sensor sections and conductor sections where a cross sectional diameter of the sensor section is at least four times that of the conductor section. Two layers of armoring are provided with a first layer wrapped in a first angular direction opposite that of the second layer. A stranding assembly is provided which has two selective positions, one for providing a die hole for stranding the conductor section, another for providing a passage hole for allowing the sensor section to pass after wrapping with armor wire.

21 Claims, 8 Drawing Sheets

U.S. PATENT DOCUMENTS

| | | |
|---|---|---|
| 6,041,282 A | 3/2000 | Wardeberg et al. |
| 6,131,658 A | 10/2000 | Minear |
| 6,292,431 B1 | 9/2001 | Talamo |
| 6,333,897 B1 | 12/2001 | Knudsen et al. |
| 6,333,898 B1 | 12/2001 | Knudsen et al. |
| 2001/0016103 A1 | 8/2001 | Hoch |
| 2004/0081018 A1 | 4/2004 | Sawin et al. |

ARMORED SEABED LAID SEISMIC CABLE AND METHOD AND APPARATUS FOR MANUFACTURING SAME

CROSS REFERENCE TO RELATED APPLICATION

This application is a continuation application of U.S. patent application Ser. No. 10/283,426 filed on Oct. 29, 2002 now U.S. Pat. No. 7,184,364, the priority of which is claimed.

BACKGROUND OF THE INVENTION

1. Field of the Invention

This invention relates generally to seismic cables, and in particular to seismic cables designed for laying on the sea floor. Such cables are installed in arrays on the sea floor and detect sound waves reflected from subterranean strata in the earth's crust in response to energy pulses in the sea from an air gun.

2. Description of the Prior Art

Seabed laid seismic cables are known that include lengths of conductors that connect spaced sensor devices that are powered and interrogated from a surface vessel or fixed platform. Seabed laid seismic cables must be armored, because the cables are subjected to wear and abrasion when being installed on the sea floor and are required to be placed in mud and silt for long periods of time. Such cables also must be capable of withstanding marine growths, such as barnacles, etc.

Armored cables are generally known. For example, U.S. Pat. No. 4,439,633 discloses an armored cable and method of manufacturing the cable where an inner conductor is supported within a polyethylene tube, about which helically wrapped steel armoring is placed. U.S. Pat. No. 6,041,282 shows a number of elongated conductors (electrical and/or optical) which are arranged to be interconnected with a number of seismic sensor devices positioned at intervals along the cable. The '282 cable includes a central polyethylene tube. The sensors are placed at intervals along the tube, but power and signal conductors are arranged in stranded fashion over the tube. A polyethylene jacket covers the conductor, and steel wire armoring extends along the length of the entire cable. As the '282 cable has conductors and sensors characterized by an essentially constant diameter, armoring of the cable is not an unusual problem, because planetary armoring machines are known which helically wind steel strands about conductor lengths to produce an armored cable.

Seabed laid seismic cables desirably include geophone sensors in addition to hydrophones at instrumentation pods or sensor sections placed along the cable. A typical commercially available geophone may be approximately 1 inch in length and 7/8" in diameter. The geophones take up more radial space than that of the conductor bundle, and the sensor assembly of which they are a part must be mounted in a protective housing in pods or sensor sections placed at intervals along the cable. U.S. Pat. No. 4,078,223 shows a seismic cable with sensor assemblies spaced along the cable of a larger diameter than that of the conductor sections between them. The '223 seismic cable has a plastic sheath placed over the conductor section and sensor assemblies, but no steel wire armoring. U.S. Pat. No. 4,241,427 shows Kevlar strands covering the conductor sections and sensor assemblies for protecting the cable. U.S. Pat. No. 3,939,464 shows a protective cage for sensor assemblies with a braided covering for the larger diameter sensor assemblies and the smaller diameter conductor sections.

U.S. Pat. No. 6,333,897 shows a housing for a sensor assembly interconnected with a central strength member of each of the conductor sections on opposite ends of the sensor assembly. The housing is made as small as possible so that, after the sensor assembly is interconnected with the conductor and the central strengths members, armoring of the conductor sections and of the housing can be provided. No disclosure is provided as to how steel wire armoring is applied to the in line housing and conductor housings, but illustrations in the '897 patent illustrate that the diameter of the housing is about less than twice the diameter of the conductor section.

U.S. Pat. No. 6,333,898 shows a seabed laid seismic cable where a sensor housing is placed outwardly of the conductor sections. At a location where sensor housings are to be placed, a sleeve is placed about the conductor section with an opening to connect jumpers between the sensor devices in the housing to conductors inside the sleeve. The conductor sections and sleeve are armored with stranded steel wire prior to attachment of the sensor housing to the sleeve. In other words, the sensor housing is not protected by the steel wire armoring.

3. Identification of Objects of the Invention

A primary object of the invention is to provide a method and apparatus for applying stranded steel wire armoring to a seismic cable which includes conductor sections interconnected with sensor housings, where the steel wire armoring is applied in continuous strands about the exterior of the conductor sections and the exterior of the sensor housings.

An important object of the invention is to provide a method and apparatus for applying stranded steel wire armoring to interconnected conductor sections and sensor housings where the outer diameter of the sensor housing is about four times as great as that of the conductor sections.

Another object of this invention is to provide a steel wire armored seismic cable with sensor housings which are about four times as great in diameter than that of the outer diameter of the conductor sections.

SUMMARY OF THE INVENTION

The objects identified above as well as other features and advantages of the invention are incorporated in a steel wire armored seismic cable having integrated seismic sensor sections and conductor sections, where the outer diameter of the sensor section is about four times as great as that of the conductor sections. Prior to armoring, the conductor sections and sensor housing sections are interconnected with two sets of conductors provided in the conductor sections. At each sensor housing section, a first set of conductors is connected at each end of the housings. The second set of conductors passes outwardly along the sensor housing section. At the next sensor housing section of the integrated cable, the second set of conductors is connected at each end of the housing, but the first set of conductors passes around that sensor housing section. Conical bend restrictors are placed over the conductor sections adjacent each of the two ends of the sensor housing. Next, rings with spaced lugs are secured about the periphery of the sensor housing. The cable, integrated sensor housings, conical bend sections, and wire spreading lugs are wound onto a large drum so that the cable is ready for passing through two stages of a planetary steel wire armoring machine.

At each station the planetary winding machine is arranged to produce bends in the steel wires prior to their being wrapped in a helical pattern about the conductor section at a conductor closing die. At a first station, the winding machine wraps the steel wire in a first direction at a first conductor closing die. At a second station, the winding machine wraps the steel wire in a direction opposite that of the first direction at a second closing die. The closing dies are mounted on respective first and second winding assemblies. When the conductor section is pulled through a "conductor" closing die, the respective winding assemblies are prevented from moving, while the cable is pulled through the conductor die. As a result, the steel wires are forced by the closing die to be wound tightly in a helical path about the conductor sections. The conductor section is characterized by an outer diameter of about 25 millimeters with each of the conductor closing dies being of a corresponding diameter, which is slightly larger than the diameter of the conductor section.

When a sensor housing section approaches one of the conductor closing dies at a winding assembly, the pulling of the cable stops, bending of the wire strands is ceased at the planetary machine, and a large diameter "housing" closing passage replaces the conductor closing die. The winding machine again starts turning at a slow rate with the cable being pulled forward. The winding assembly is allowed to move forward with the pulling of the cable. The pulling of the cable pulls the housing section and the winding assembly in a forward direction, because a gripping cylinder temporarily secures the front end of the housing section to the winding assembly. The housing closing passage is of a diameter sufficiently large to allow the sensor housing to pass through it after the housing is wrapped with armor wires. In a preferred embodiment the outside diameter of the sensor section is about 125 millimeters.

An operator insures that the wire strands are uniformly helically distributed about the outer surface of the housing section prior to passing through the housing closing die by positioning the wire in spaces between lugs of rings secured around the outer surface of the housing section. The spaces are uniformly placed about the periphery of the housing. When the housing has been pulled through the housing closing passage, the conductor closing die replaces the housing closing passage, bending of the steel wire strands is reestablished in the planetary winding machine, and armoring of the conductor section at the first station and/or at the second station continues until another housing section approaches a conductor closing die at the first or the second station, and the above procedure is repeated.

BRIEF DESCRIPTION OF THE DRAWINGS

FIGS. 11-16 illustrate the armoring of the housing section of the seismic cable, with:

DESCRIPTION OF THE PREFERRED EMBODIMENT OF THE INVENTION

Figure 1:
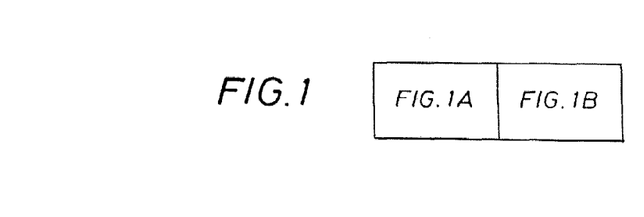
FIGS. 1A and 1B illustrate a seabed seismic cable with conductor sections and sensor housing sections having steel wire strands being applied at first and second planetary wire stranding stations with a conductor section passing through a conductor die at a first station (FIG. 1B) and a housing section being wrapped prior to the passage through a housing die at a second station.
Figure 1A:
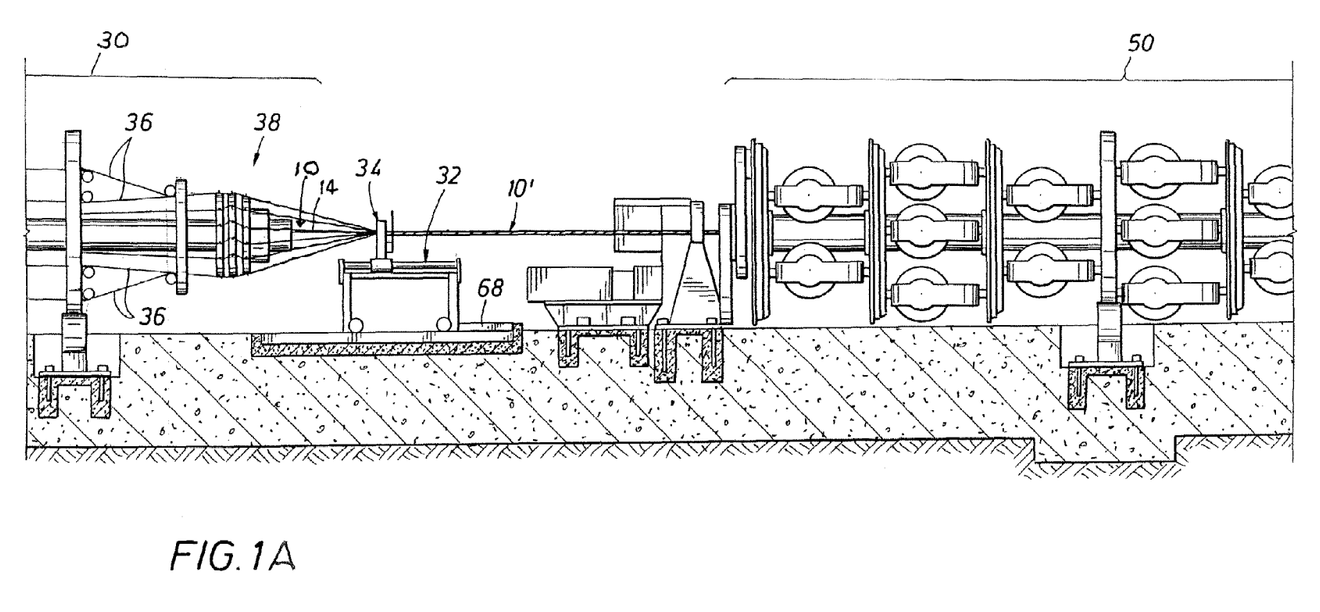
Figure 1B:
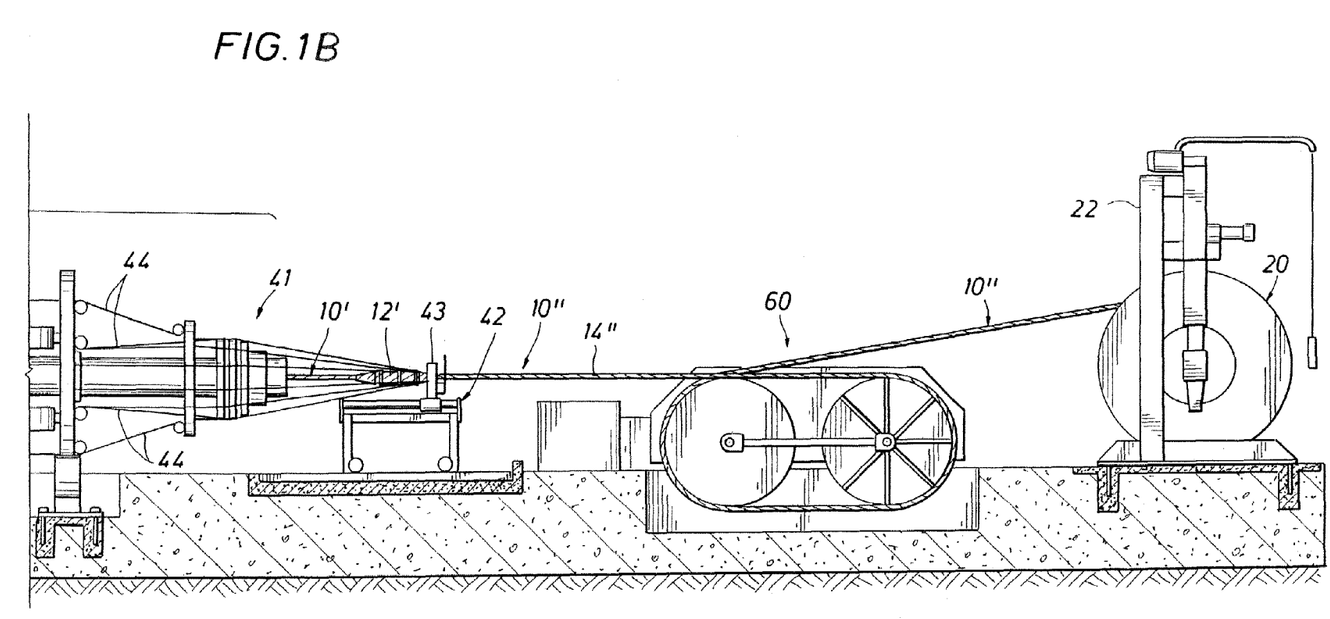

FIGS. 1A and 1B illustrate a manufacturing line by which a seismic cable 10 (including conductor sections 14 and housing sections (see FIGS. 1A, 2, 4)) is armored with continuous strands of steel wire so that the cable 10 is capable of long term operation when laid on a sea floor. The unarmored cable 10 of FIG. 1A is first wound on a preparation spool (not shown) which is supported from a frame (not shown). After armoring of the conductor sections 14 and the housing sections 12, the completed armored cable 10" of FIG. 1B is wound onto a take-up spool 20 which is supported from a frame 22.

First and second planetary wire armoring machine stations 30 and 50 are commercially manufactured by Caballé of Spain. The cable 10" with steel strand armoring over conductor section and housing section is pulled through armoring machines 30 and 50 by motor traction spools 60.

Figure 5:
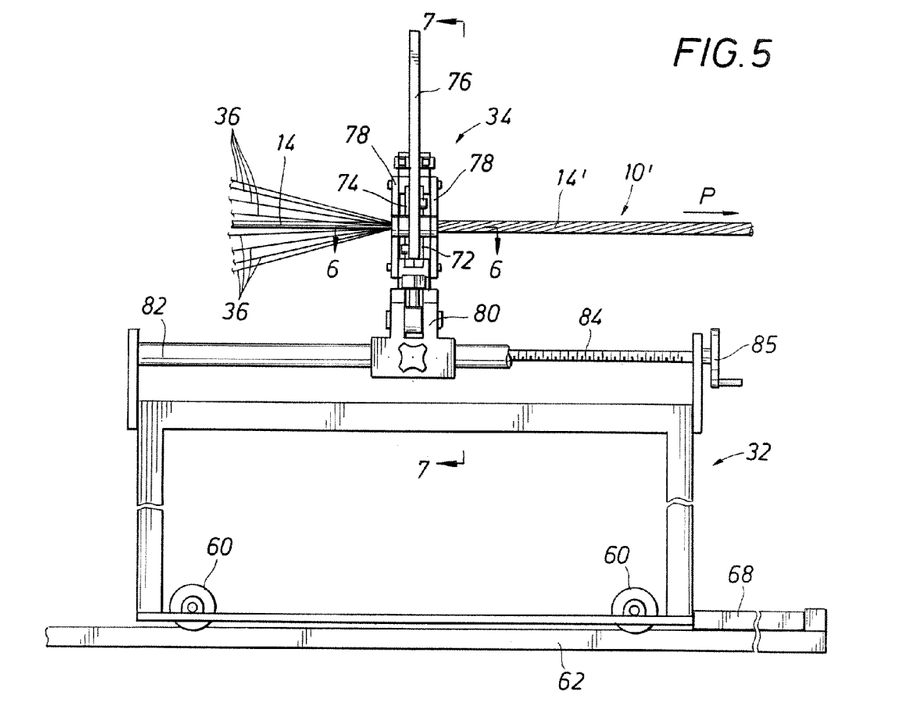
FIG. 5 is a side view of a stranding assembly mounted on a carriage with a conductor section passing through a conductor die of the stranding assembly, where the carriage is prevented from forward motion as the armoring machine pulls the cable through the conductor die, with a specific illustration of a conductor section having a first layer of steel strands applied thereto.
Figure 6:
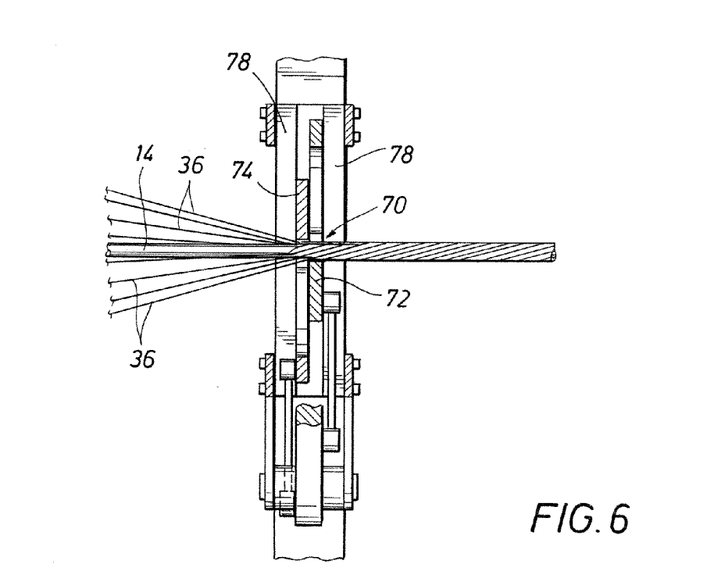
FIG. 6 is a sectional view looking downward along lines 6-6 of FIG. 5 with an illustration of the conductor die of the stranding assembly being created by complimentary slots of forward and rear plates of the stranding assembly.
Figure 7:
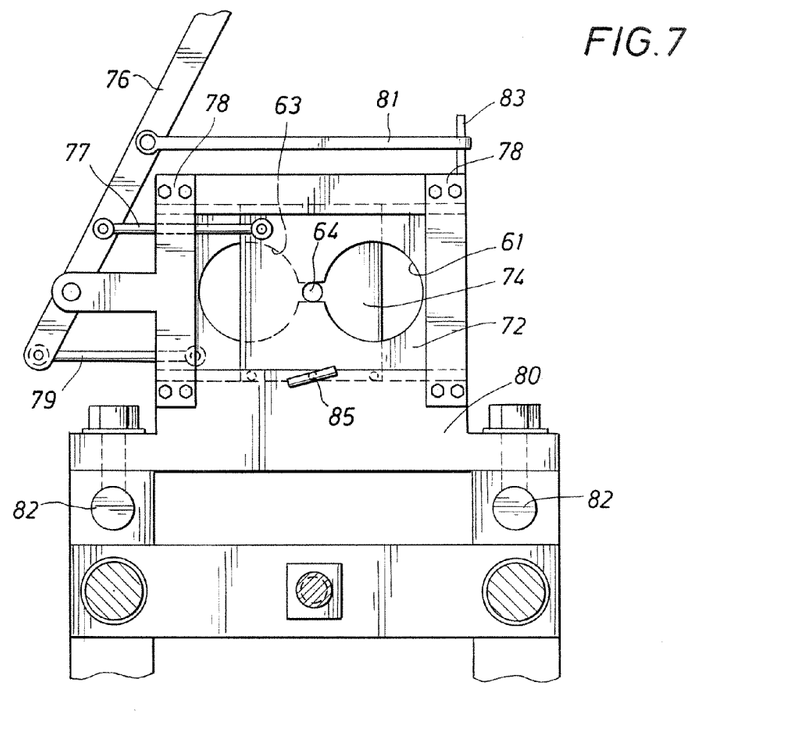
FIG. 7 is an end view taken along lines 7-7 of FIG. 5 of the stranding assembly illustrating the forward and rear plates positioned so that a conductor die is formed by complimentary slots in the middle portion of each plate.

FIG. 1A illustrates a first station carriage 32 on which a stranding assembly 34 is configured with a conductor die (see FIGS. 5, 6, 7). In a preferred embodiment, the first planetary winding machine 30 includes four banks of six bobbins (not shown) which supply twenty four steel wire strands 36 (only a few of which are illustrated for clarity) as they are pulled across winding head 38 toward first stranding assembly 34. The unarmored seismic cable 10, after passing through the first stranding assembly 34 becomes an intermediate stage seismic cable 10' with a first layer of armoring wire.

Figure 16:
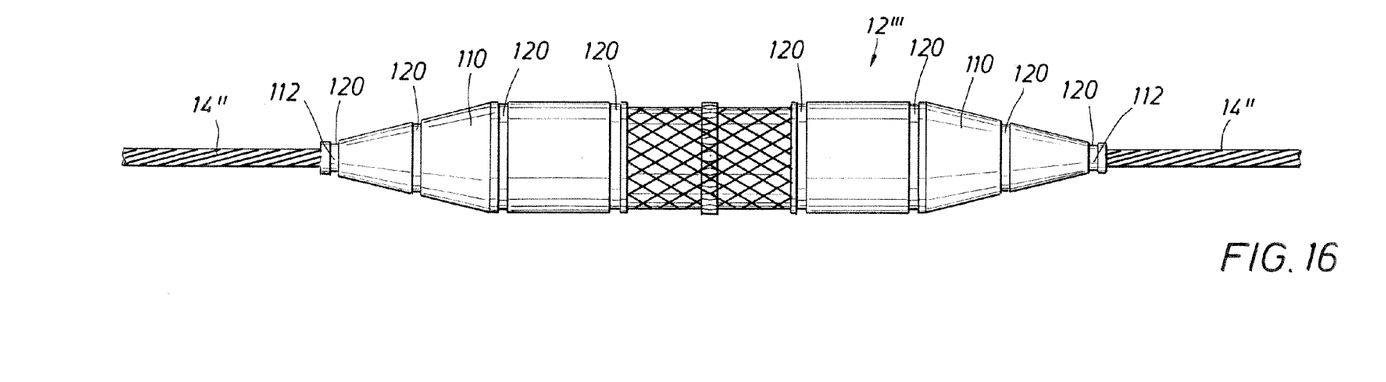
FIG. 16 illustrating the housing section after the first and second helical layers of wire strands have been applied (see FIG. 15) and showing bend restrictors and cylindrical protective sleeves secured about the armored housing.

The intermediate cable 10' passes through the second planetary machine 50 and to second stranding assembly 43 disposed on second stage carriage 42. The second planetary wire stranding machine 50 includes five banks of six bobbins and a winding head 41 such that thirty steel wire strands (only a few of which are illustrated) are wound onto intermediate cable 10' as the cable section 10" is pulled through the machine. According to the invention, the conductor sections 14' and the housing sections 12' of intermediate cable 10' have a second layer of armor strands applied to them. FIG. 1B shows a stage of the manufacturing process where the second layer of armor strands applied from winding head 41 are applied at second stranding assembly 43 to a housing section 12' of the intermediate seismic cable. A final cable section 10" includes armored conductor section 14" and armored sensor housing sections 12" (see FIG. 15 and 12''' as illustrated in FIG. 16).

The ratio of the rotation of traction spool device 60 and the first armor station 30 determines the lay length of the first pass armor. Likewise, the ratio of the rotation of traction spool device 60 and the second armor station 50 determines the lay length of the second pass armor. Lay length is defined as the longitudinal distance required for an armor wire 36 or 44 to make one full rotation around the cable. The lay length of the first pass armor and the second pass armor are similar but somewhat different. In the preferred embodiment the first pass armor lay length is approximately 150 millimeters; the lay length of the second pass armor is approximately 180 millimeters.

The lay angle of the armor is defined as the angle between the armor wire and the longitudinal axis of the cable. Lay angle is primarily controlled by the lay length of the armor and the diameter of the cable. A constant lay angle must be maintained even as the housing sections 12 (see FIG. 4) have a first pass armor applied at stranding assembly 34. This is accomplished by changing the lay length settings for the first pass armor bay 30 as a housing section passes through stranding assembly 34, and returning to the original lay length setting after the housing section 12 has passed through stranding assembly 34. Likewise the lay length setting for the second armor bay 50 must be adjusted as housing section 12' passes through stranding assembly 43.

Figure 2:
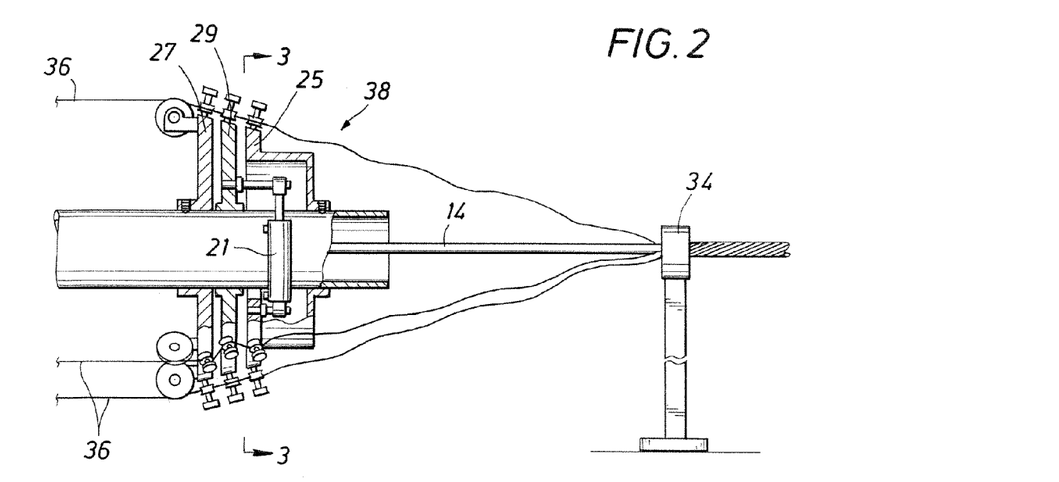
FIGS. 2, 3, and 4 show the winding head of the planetary wire stranding machines by which the wire strands are bent (FIG. 2) prior to application of a conductor section or straightened (FIG. 4) while wrapping of a housing section.
Figure 3:
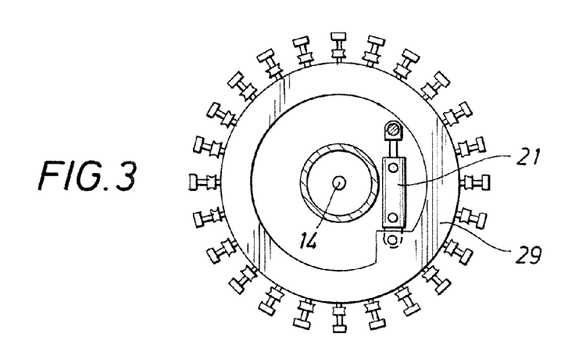
Figure 4:
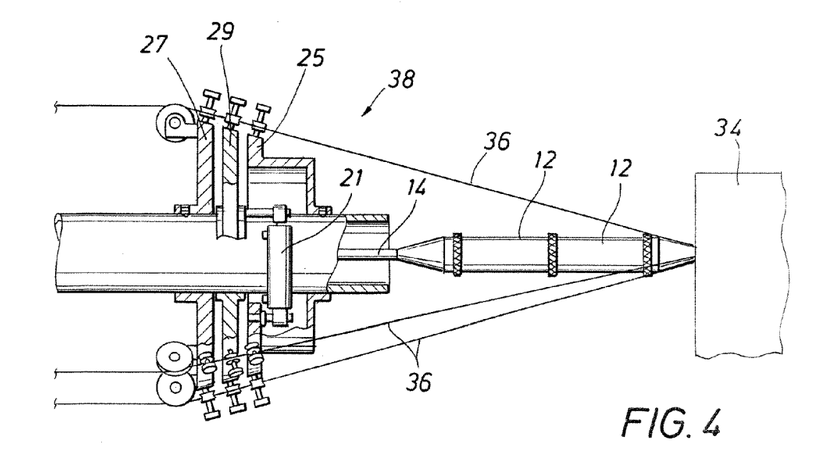

FIGS. 2, 3, and 4 illustrate a function of the winding heads 38 (winding head 41 at the second stage functions in a similar way) when applying armoring to unarmored conductor section 14 (FIG. 2) or to housing section 12 (FIG. 4). For the case of applying armoring strands to conductor section 14 though stranding assembly 34, it is necessary to provide bends to the cable as it passes through stranding assembly 34. The winding head 38 rotates about the longitudinal axis of the conductor section 14 when applying the strands to the conductor section through winding assembly 34. With bends applied to each strand, by rotating disk 29 a small angular distance with respect to disks 25 and 27, the bent strands do not create a "spring effect" if the conductor section were to be cut or separated. It is desirable to eliminate such spring effect. Accordingly, bends are provided in the armor wires while wrapping conductor sections as illustrated in FIG. 2. FIG. 3 shows a hydraulic cylinder 21 connected to disk 29 for moving it out of rotational alignment (e.g. in FIG. 2) and into rotational alignment as illustrated in FIG. 4. FIG. 4 illustrates that disk 29 has been moved into rotational alignment with disks 25 and 27 of winding head 38 where the forward end of the housing section 12 first enters into stranding assembly 34. The "bends" in the armoring wires are removed, and as the head 38 rotates, the armoring wires are wrapped about the exterior of housing section 12 until the entire outside thereof has been wrapped, and where the rear end of the conductor section 14 clears the stranding assembly 34, the disk 29 is again rotated by cylinder 21 and the bends in the wire strands 36 are again established for armoring the next conductor section.

Figure 8:
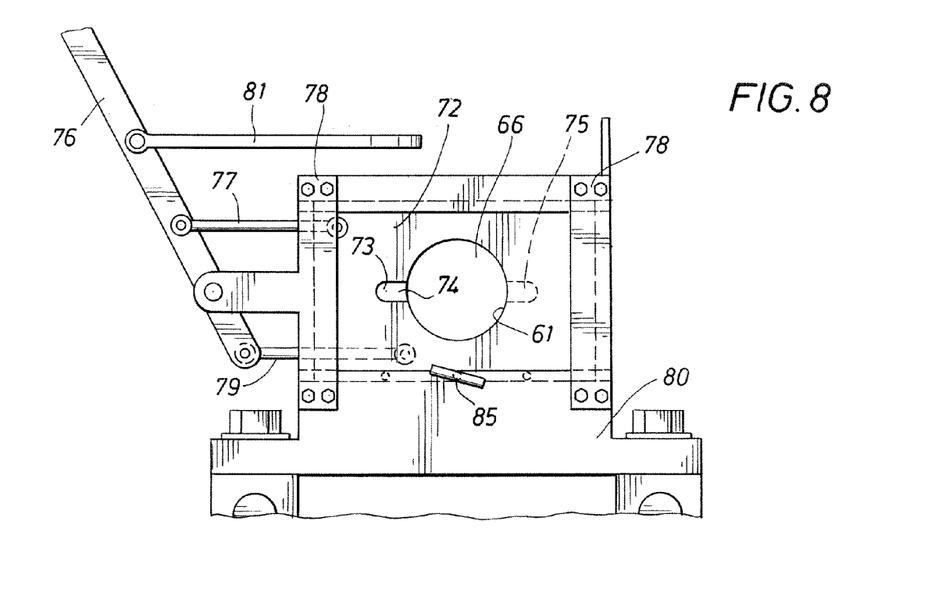
FIG. 8 is an end view of the stranding assembly illustrating the forward and rear plates positioned so that a housing passage is formed by complimentary holes at opposite sides of each plate with a mechanism for bringing the holes into registration to form the housing passage.

FIGS. 5, 6, 7, and 8 illustrate the stranding assembly 34, which includes mechanisms for establishing a die passage 64 for stranding wires 36 about conductor section 14 and for providing a housing passage 66 for a housing section 12 to pass through after it is stranded (See FIG. 8).

FIG. 5 illustrates first stage carriage or frame 32 that is free to move on foundation 62 in the direction of the pull force arrow P on wheels 60 when a blocking member 68 is not in place. As shown in the cross sectional view of FIG. 6, and by reference to FIGS. 7 and 8, a conductor section stranding die 70 is established when forward plate 72 is in a first position of FIGS. 5, 6, and 7 such that the half cylinder opening 73 of forward plate 72 is in registration with the half cylinder opening 75 of rear plate 74. As illustrated in FIGS. 5, 6, and 7, the forward plate 72 and rearward plate 74 are coupled to a handle 76 via pivot rods 77, 79. When the handle 76 is pushed toward frame members 78, the forward plate 72 is pushed forward, and the rear plate 74 is pulled rearward (when viewed from the views of FIGS. 7 and 8) thereby creating the die passage 64 between the two plates 72, 74. An elastomeric strap 81 is removably positioned over an upper member 83 of frame 78 to maintain the handle 76 in the forward position. A pin 85 maintains the plates 72 and 74 in the position of FIG. 7 through registered holes in the plates when in that position, and in the position of FIG. 8 through other registered holes. As illustrated in FIG. 8, when the handle 76 is pulled away from frame member 78, the large cylindrical hole 61 of forward plate 72 and hole 63 of rear plate 74 are brought into registration to form passage 66 for the passage of stranded sensor sections 12 of the seismic cable 10.

The stranding assembly 34 described above is mounted on a standard 80 (see FIG. 5) which can move longitudinally on rails 82 mounted on frame 32. A threaded rod can be rotated by handle 85 to move the stranding assembly 80 longitudinally along the stranded conductor section 10'.

When the conductor section 14 is being stranded, the carriage 32 is blocked from horizontal movement by blocking member 68 so that the die hole 64 in the stranding assembly 34 is maintained at a constant longitudinal position when the conductor section 14 of the cable is being pulled through it (becoming a first armored layered conductor 14' after passing through the die hole 64).

The stranding assembly 43 is positioned at the forward end of second planetary winding machine 50 (FIG. 1B) and is constructed substantially identically to that of stranding assembly 34 positioned at the forward end of the first planetary winding machine 30. The die passage of stranding assembly 43 (similar to that of passage 64 of assembly 34) is slightly larger in diameter than that of assembly 34 so as to accommodate two layers of armor wires over conductor sections. The passage for sensor section (similar to that of passage 66 of assembly 34) is also slightly larger in diameter so as to accommodate two layers of armor wires over the sensor housing sections.

Figure 9:
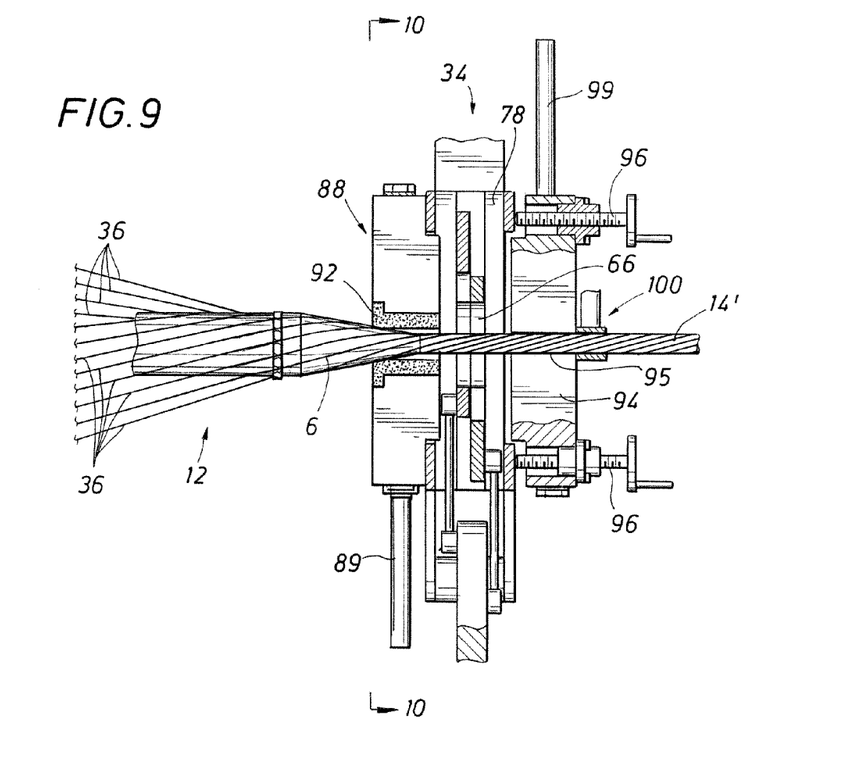
FIG. 9 illustrates a sectional side view of the stranding assembly of FIG. 8, but with a forward and a rear assembly secured to forward and rearward faces of the forward and rear plates with the forward assembly having an elastomeric member for gripping the forward end of the housing section of the seismic cable while it is being wrapped with armor strands and with the rear assembly gripping a conductor section so that the cable does not translate with respect to the stranding assembly while armor strands are being wound about the housing.
Figure 10:
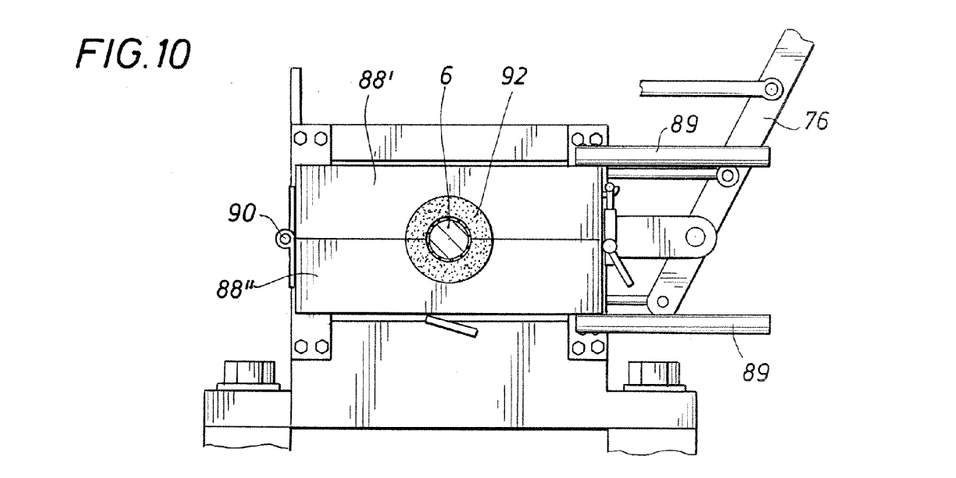
FIG. 10 is a view of the stranding assembly of FIG. 9 taken along lines 10-10 of FIG. 9 which illustrates the forward assembly with an elastomeric member designed for gripping the forward end of the housing section of the seismic cable.

FIGS. 9 and 10 illustrate the stranding assembly 34 that is selectively converted from stranding wire strands about the conductor section 14 to an assembly for stranding the sensor housing sections 12. When a housing section 12 approaches the stranding assembly 34, the traction pulling drums 60 are stopped with the forward end of a sensor section 12 positioned to enter the stranding assembly 34, as illustrated in FIG. 4. The bend has been removed from the stranding wires 36 so that substantially straight steel strands 36 are ready for wrapping about the exterior of the housing 12. As illustrated in FIG. 9, a rear split ring member 88 is positioned over the forward conical portion 6 of the sensor section 12. FIG. 10 illustrates the two halves 88' and 88" hinged at 90 and latched about forward conical portion 6 with an elastomatic cylinder 92 gripping the forward portion 6 and preventing its longitudinal passage through stranding assembly 34. Handles 89 are used by an operator to close halves 88' and 88" about the forward end 6 of the sensor section. The handle 76 has been pulled to its outward position thereby creating the passage 66 through the stranding assembly 34.

A forward split ring member 94 is positioned about the forward end of the stranding assembly 34, as illustrated in FIG. 9, and has a passage 95 sized for clamping about conductor 14' which has had armoring applied to it. Threaded bars 96 engage the body 78 of stranding assembly 34 so that a small horizontal distance separates member 94 from body 78. Handles 89 and 99 allow an operator to grip the forward end 6 of the housing section 12 and the armored section 14' while stranding is being applied to sensor section 12 to prevent section 12 from rotating while the armor strands are being wrapped with strands 36 from rotating head 38. The conductor section 14' and housing section 12 are prevented from rotation during stranding, because forward clamping member 94 grips the conductor section 14' and pulls conical portion 6 into elastomeric cylinder 92. As shown in FIG. 1B, anytime a sensor section is being stranded with steel wire strands, the blocking member 68 (of FIG. 5) has been removed so that a carriage 42 (as shown in FIG. 1B) moves with the cable as it is being pulled forward while stranding about the sensor housing section.

As explained in more detail below, at the first stage, unbent armor wires are wound about a sensor section 12 while the head 38 rotates, the sensor section 12 being held in place as shown in FIG. 9 with the carriage 32 moving forward by the coupling of the conductor section 10' to stranding assembly 34 and the intermediate mounting member. As the winding head slowly rotates in coordination with the pulling of the cable forward, the steel strands are placed in openings 110 between 24 lugs of the forward, middle and rear spacing rings 105. (See FIGS. 11, 12, 13.) The twenty-four openings 110 correspond to the twenty four strands applied by first planetary winding machine 30 and winding head 38. In other words, as the stranding of the housing section 12 occurs at winding assembly 34 immediately forward of stage one winding head 38, an operator manually assures that each one of the stranding wires is placed in one of the openings 110 between lugs. At the second winding stage, the second winding head turns in an opposite direction to that of first stage winding head 38 and preferably applies thirty wire strands about the conductor section 14' and about the sensor section 12'. The operator assures that at every fourth lug opening, two wire strands are placed in an opening 110 with one wire being placed in the next three openings and so on. As a result, each lug ring of the housing section has six openings spaced around each lug ring each of which have two strands placed therein and the other eighteen openings have one strand per opening placed therein for a total of thirty strands.

Figures 11, 13:
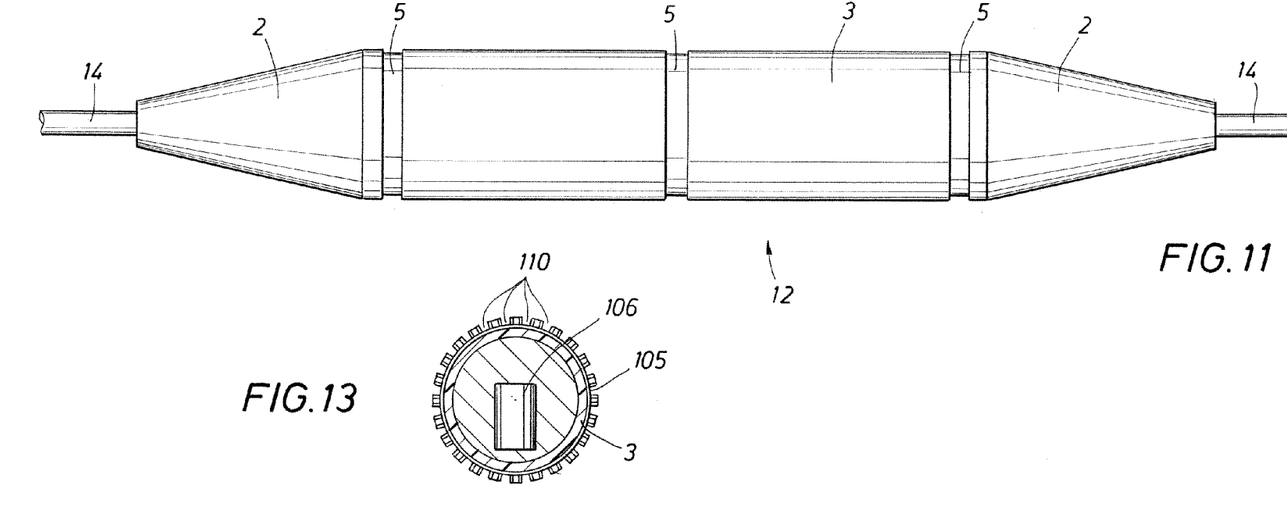
FIG. 11 showing the housing section with conical bend restrictor members secured to the leading and trailing ends of the conductor sections and secured to the forward and rear ends of the housing section.
FIG. 13 illustrating in a cross section the housing section taken along lines 13-13 of FIG. 12 and schematically showing an internal geophone mounted in the interior of the housing and the lugs of the ring secured about the periphery of the housing section.
Figure 12:
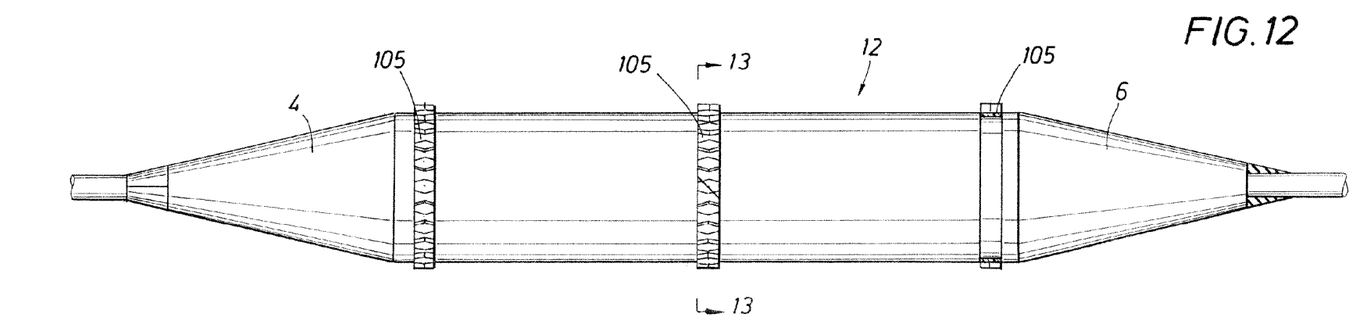
FIG. 12 illustrating lug rings secured about the periphery of the housing section.

FIGS. 11-16 illustrate the make up and stranding of each sensor housing 12. The sensor housings 12 include sensors such as geophones and a hydrophone in a cylindrical tube. Conductor or optical fibers of conductor sections are interconnected with the sensors of the housing 12. FIG. 11 shows the sensor housing 12 with a central portion 3 and conical end portions 2 secured to the front and rear ends of central portion 3. Grooves 5 are formed at the front, middle and rear part of the housing 3 and lug rings 105 as described above are therein. Each ring 105 has a slit in it that allows it to be opened for wrapping about housing 3. The rings 105 are made of hard plastic material and are glued to secure them in the grooves 5. FIG. 13, a cross section view taken along lines 13-13 of FIG. 12, shows a lug ring 105 in profile with twenty four openings therein and schematically illustrates a sensor 106 placed in the interior of the sensor section. Certain conductors within the conductor section 14 communicate with the sensors within the housing 12; other conductors (not shown) pass outwardly and around the housing from a forward conductor section to a rearward conductor section.

Figures 14, 15:
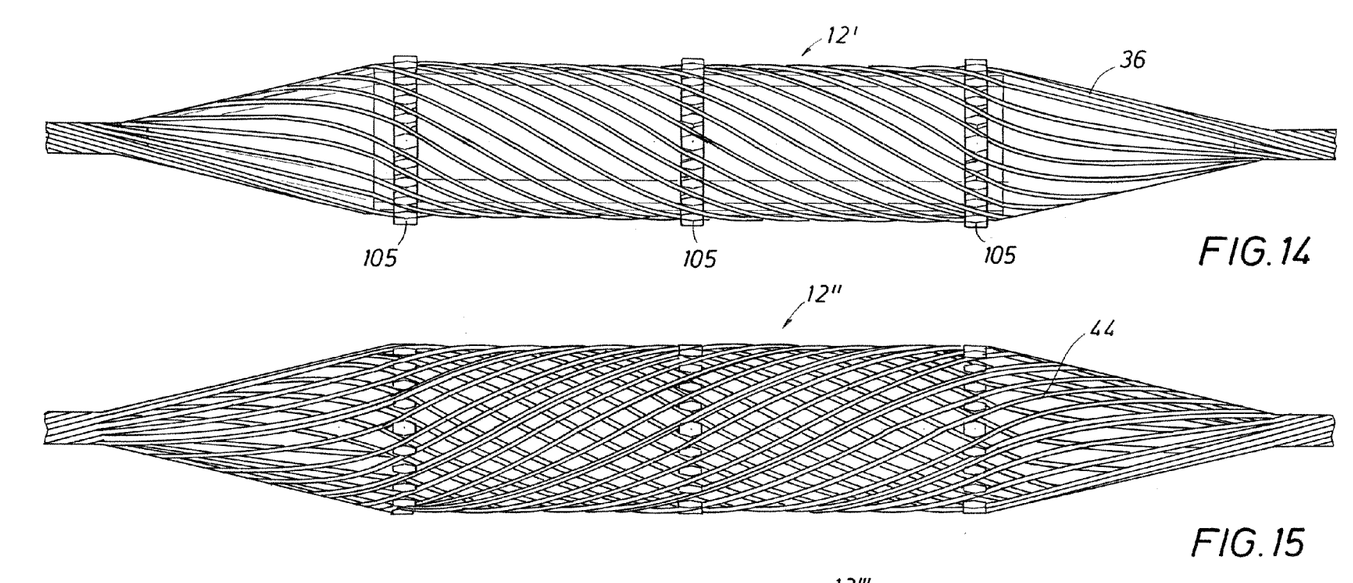
FIG. 14 illustrating a first plurality of wire strands wrapped at the first station in a first helical direction with a the lugs of the rings spacing the wire strands as they are wrapped about the housing section.
FIG. 15 illustrating a second plurality of wire strands wrapped in a second helical direction at the second station with the lugs of the rings spacing the wire strands and providing spacing for an additional number of wire strands compared to the number provided at the first station.

FIG. 14 shows armor wire strands 36 wrapped in one direction about sensor section 12 with each of the openings of the lug rings 105 having one wire strand 36 therein. FIG. 15 shows armor wire strands 44 wrapped in an opposite direction about sensor section 12" with every fourth lug opening having two wire strands 44 therein.

FIG. 16 shows a sensor section 12'" after the sensor section 12 has had two sets of armoring strands applied to it as in FIG. 15 and after split plastic bend restrictors 110 with integral conical boots 112 are attached about the conductor sections. The bend restrictors/conical boots are secured to the sensor section by steel latching rings placed in grooves 120. After the bend protectors 110 and boots 120 are wrapped with tape, the seismic cable 10" is wound (See FIG. 1C) about traction device 60 and ultimately spooled on spool 20 as a completed length of seismic cable.

An exemplary armored seismic cable 10", manufactured as described above is 3.6 km overall length with 72 sensor housings 12'" spaced at 50 meters from each other. The outer diameter of the conductor sections of the exemplary cable is about 25 millimeters while the outer diameter of the sensor sections of the cable is about 125 millimeters.

What is claimed is:

1. A seismic cable comprising:
   a housing having a shape generally characterized by a cylinder of a nominal cylinder diameter axially connected at the first and second cylinder ends to first and second conical frustums, respectively, that define first and second housing ends of diameters less than said nominal cylinder diameter;
   an elongate first cable section including a conductor for transmitting a signal, said first cable section connected to said housing at said first housing end;
   an elongate second cable section connected to said housing at said second housing end;
   a sensor disposed in said housing and operatively coupled to said conductor;
   a first plurality of guides spaced about the circumference of said housing along a first axial length of said housing near said first cylinder end, said first plurality of guides defining a first plurality of channels (110) interposed between said first plurality of guides;

a second plurality of guides spaced about the circumference of said housing along a second axial length of said housing near said second cylinder end, said second plurality of guides defining a second plurality of channels interposed between said second plurality of guides; and a first armor layer formed by a first plurality of metal wires laid parallel and helically in a first direction around said first cable section, said housing and said second cable section, each of said first and second pluralities of channels receiving at least one of said first plurality of metal wires.

2. The cable of claim 1 further comprising:

a third plurality of guides spaced about the circumference of said housing along a third axial length of said housing between said first and second pluralities of guides, said third plurality of guides defining a third plurality of channels interposed between said third plurality of guides, each of said third plurality of channels receiving at least one of said first plurality of metal wires.

3. The cable of claim 1 further comprising:

a second armor layer formed by a second plurality of metal wires laid parallel and helically in a second direction around said first cable section, said housing and said second cable section, each of said first and second pluralities of channels receiving at least one of said second plurality of metal wires.

4. The cable of claim 3 wherein:

said second direction is opposite-hand of said first direction.

5. The cable of claim 1 wherein:

said first armor layer defines a first lay angle over said first cable section and a second lay angle over said housing; and said first lay angle approximately equals said second lay angle.

6. The cable of claim 5 wherein:

said housing is enclosed.

7. The cable of claim 1 further comprising:

first and second rings carrying said first and second pluralities of guides, respectively, said first and second rings coupled to said housing.

8. The cable of claim 7 further comprising:

first and second circumferential seats formed in said housing and arranged for receiving said first and second rings.

9. The cable of claim 7 further comprising:

first and second slits formed in said first and second rings, respectively, and arranged for receiving said first and second cable sections into said first and second rings through said first and second slits, respectively.

10. The cable of claim 7 further comprising:

a first adhesive bond between said first ring and said housing; and a second adhesive bond between said second ring and said housing.

11. An armored cable comprising:

a first section having a shape generally characterized by a cylinder of a nominal cylinder diameter with at least the first cylinder end being axially connected to a conical frustum that defines a first section first end of a diameter less than said nominal cylinder diameter;

an elongate second section connected to said first section at said first section first end;

a first plurality of guides spaced about the circumference of said first section along a first axial length of said first section near said first section first end, said first plurality of guides defining a first plurality of channels interposed between said first plurality of guides; and a first armor layer formed by a first plurality of metal wires laid parallel and helically in a first direction around said first section and said second section, each of said first plurality of channels receiving at least one of said first plurality of metal wires.

12. The cable of claim 11 wherein:

said shape of said first section is further characterized by frustoconical second end.

13. The cable of claim 12 further comprising:

an elongate third section connected to said first section at said first section second end.

14. The cable of claim 11 further comprising:

a second armor layer formed by a second plurality of metal wires laid parallel and helically in a second direction around said first section and said second cable section, each of said first and second pluralities of channels receiving at least one of said second plurality of metal wires.

15. The cable of claim 14 wherein:

said second direction is opposite-hand of said first direction.

16. The cable of claim 11 wherein:

said first armor layer defines a first lay angle over said first section and a second lay angle over said second section; and said first lay angle approximately equals said second lay angle.

17. The cable of claim 11 further comprising:

a ring carrying said first plurality of guides, said ring coupled to said first section.

18. The cable of claim 17 further comprising:

a circumferential seat formed in said first section and arranged for receiving said ring.

19. The cable of claim 17 further comprising:

an adhesive bond between said ring and said first section.

20. A seismic cable comprising:

a plurality of conductor sections interconnected with a plurality of sensor sections, each of said conductor sections including at least one conductor, each of said sensor sections including a sensor housing having a sensor mounted therein;

a plurality of lug ring pairs each coaxially disposed about one of said plurality of sensor sections, each lug ring defining a plurality of guide spaces; and a plurality of steel wire armoring strands wound continuously in a non-interlaced fashion over the entire length of the cable over all of said plurality of sensor sections and all of said plurality of conductor sections to form an armor layer, each of said plurality of armoring strands placed in one of said plurality of guide spaces of each lug ring.

21. A seismic cable comprising:

a plurality of conductor sections interconnected with a plurality of sensor sections, each of said conductor sections including at least one conductor, each of said sensor sections including a sensor housing having a sensor mounted therein;

a first plurality of steel wire armoring strands wound continuously in a non-interlaced fashion over the entire length of the cable over all of said plurality of sensor sections and all of said plurality of conductor sections to form an inner armor layer, each of said first plurality of armoring strands including a bend therein at each of said plurality of sensor sections; and a second plurality of steel wire armoring strands wound continuously in a non-interlaced fashion over the entire length of the cable over said inner armor layer to form an outer armor layer, each of said second plurality of armoring strands including a bend therein at each of said plurality of sensor sections.

* * * * *